United States Patent
Garg et al.

(10) Patent No.: US 7,372,856 B2
(45) Date of Patent: May 13, 2008

(54) METHOD FOR REAL-TIME TRANSPORT PROTOCOL (RTP) PACKET AUTHENTICATION

(75) Inventors: Sachin Garg, Green Brook, NJ (US); Navjot Singh, Denville, NJ (US); Timothy Kohchih Tsai, Alviso, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 775 days.

(21) Appl. No.: 10/854,702

(22) Filed: May 27, 2004

(65) Prior Publication Data

US 2005/0265349 A1    Dec. 1, 2005

(51) Int. Cl.
H04L 12/28    (2006.01)
H04L 12/56    (2006.01)
(52) U.S. Cl. .................................................. 370/395.2
(58) Field of Classification Search ................ 370/395, 370/392, 363, 260, 352, 389, 395.2, 338, 370/349, 310, 335, 322; 705/65, 67; 713/150, 713/190, 168; 348/207; 714/724; 709/203, 709/223, 235, 249, 229, 226
See application file for complete search history.

(56) References Cited

U.S. PATENT DOCUMENTS

2003/0161302 A1 *  8/2003  Zimmermann et al.  ...... 370/363

OTHER PUBLICATIONS

Stefan Greuter, Jeremy Parker, Nigel Stewart, Geoff Leach; Real-Time procedural generation of 'pseudo infinite' cities, Feb. 2003, Proceedings of the 1st international conference on Computer graphics and interactive techniques in Australasia and South East Asia GRAPHITE '03, pages; Publisher: ACM Press.*
Yongdong Wu, Changsheng Xu, Feng Bao; Counterfeiting attack on a lossless authentication watermarking scheme, May 2003, Selected papers from the 2002 Pan-Sydney workshop on Visualisation—vol. 22 VIP '02, pp. 1-3, Publisher: Australian Computer Society, Inc.*
"RTP: A Transport Protocol for Real-Time Applications", H. Schulzrinne et al., IETF RFC 3550, Jul. 2003.
"The Secure Real-time Transport Protocol", M. Baugher et al., IETF RFC 3711, Mar. 2004.

(Continued)

*Primary Examiner*—Wing Chan
*Assistant Examiner*—Prenell Jones
(74) *Attorney, Agent, or Firm*—Muncy, Geissler, Olds & Lowe, PLLC

(57) ABSTRACT

A method for Real-time Transport Protocol (RTP) packet authentication on a packet data network. In particular, the invention relates to a method for preventing toll fraud, privacy compromise, voice quality degradation, or denial of service (DoS) on Voice over IP networks. The Real-time Transport Protocol (RTP) is susceptible to several security attacks, including thirdparty snooping of private conversations, injection of forged content, and introduction or modification of packets to degrade voice quality. The Secure Real-time Transport Protocol (SRTP) provides confidentiality, message authentication, and replay protection for RTP traffic. However, SRTP incurs an additional overhead to verify the HMAC-SHA1 message authentication code for each packet. SRTP+ significantly decrease the verification overhead compared to SRTP and thereby increases the number of faked packets required to mount a successful denial of service attack. SRTP+ provides packet authentication but not integrity. SRTP+ is compatible with SRTP.

16 Claims, 9 Drawing Sheets

OTHER PUBLICATIONS

"Advanced Encryption Standard (AES)", National Institute for Standards and Technology (NIST), FIPS Pub. 197.
"HMAC: Keyed-Hashing for Message Authentication", H. Krawczyk et al., IETF RFC 2104, Feb. 1997.
"An Efficient Encryption Algorithm for Audio Version 1.2", R. Gilman, Avaya COMPAS document 93923, Jul. 3, 2002.
"Security Requirements for Cryptographic Modules", National Institute for Standards and Technology (NIST), FIPS Pub. 140-2.
"Annex C: Approved Random Number Generators", National Institute for Standards and Technology, FIPS Pub. 140-2, Annex C.
"Digital Signature Standard (DSS)", National Institute for Standards and Technology (NIST), FIPS Pub. 186-2.

* cited by examiner

US 7,372,856 B2

METHOD FOR REAL-TIME TRANSPORT PROTOCOL (RTP) PACKET AUTHENTICATION

BACKGROUND OF THE INVENTION

1. Field of the Invention

The present invention relates to methods for Real-time Transport Protocol (RTP) packet authentication on a packet data network. In particular, the invention relates to methods for preventing toll fraud, privacy compromise, voice quality degradation, or denial of service (DoS) on Voice over IP networks.

2. Description of Background Art

Telephony via Voice over IP (VoIP) offers tremendous potential in rich features and cost savings. However, the leveraging of data networks and their corresponding communication protocols also carries attendant security vulnerabilities. Furthermore, VoIP protocols for signaling and media transport themselves present additional vulnerabilities that might lead to toll fraud, privacy compromise, voice quality degradation, or denial of service (DoS).

In particular, the Real-time Transport Protocol (RTP) used as the basis for media transport is susceptible to several attacks, including third-party snooping of private conversations, injection of forged content, and introduction or modification of packets to degrade voice quality.

A description of RTP can be found in

H. Schulzrinne, S. Casner, R. Frederick, and V. Jacobson, "*RTP: A Transport Protocol for Real-Time Applications*," IETF RFC 3550, July 2003, <http://www.ietf.org/rfc/rfc3550.txt?number=3550>.

In response to concerns about these RTP vulnerabilities, the Internet Engineering Task Force (IETF) Audio/Visual Transport Working Group proposed the Secure Real-time Transport Protocol (SRTP), which provides confidentiality, message authentication, and replay protection for RTP traffic. As with SRTP, SRTCP provides similar security for RTP Control Protocol (RTCP) traffic.

The SRTP specifies Advance Encryption Standard (AES) encryption of the RTP payload and a message authentication hash of the header and the encrypted payload using Keyed-Hashing for Message Authentication (HMAC-SHA1) to achieve enhanced security. Avaya products are supported by this newer AES encryption as well as the earlier implemented Avaya Encryption Algorithm (AEA) encryption. MAC-SHA1 is the default message authentication code, and its implementation is mandatory. However, optional message authentication codes are permitted. HMAC-SHA1 produces a 160-bit digest and recommends that no more than 80 bits to be truncated from the least significant end. However, 128 bits can be truncated (resulting in a 32-bit authentication tag) for bandwidth efficiency if the following conditions are met: (1) the RTP payload is stateless, (2) an attacker is unlikely to be able to intelligently modify the SRTP ciphertext, (3) and no data forwarding or access control decisions are made based on the RTP data.

Further descriptions of S RTP, AES, HMAC-SHA1, and AEA can be found respectively, in M. Baugher, D. McGrew, M. Naslund, E. Carrara, and K. Norrman, "*The Secure Real-time Transport Protocol*," IETF RFC 3711, March 2004, http://www.ietf.org/rfc/rfc3711.txt?number=3711;

National Institute for Standards and Technology (NIST), "*Advanced Encryption Standard (AES)*," FIPS Pub 197, http://csrc.nist.gov/publications/fips/fips197/fips-197.pdf;

H. Krawczyk, M. Bellare, and R. Canetti, "*HMAC: Keyed-Hashing for Message Authentication*," IETF RFC 2104, February 1997, http://www.ietf.org/rfc/rfc2104.txt?number=2104; and R. Gilman, "*An Efficient Encryption Algorithm for Audio Version* 1.2," Avaya COMPAS document93923, Jul. 3, 2002.

One potential concern for SRTP is the overhead imposed by the authentication hash. As seen in FIG. 1, the entire header and encrypted payload are hashed via the HMAC-SHA1 algorithm to produce an 80-bit or 32-bit message authentication tag. The tag must be computed so that each packet can be authenticated.

Thus, one possible denial of service attack is to bombard a target with a series of forged packets, each of which contains an improper authentication tag.

FIG. 2 shows the steps for computing an authentication tag using HMAC-SHA1. The main computation includes hashing N=L+3 blocks of 512 bits, where L=ceil(M/64) and M is the number of bytes in the RTP header and payload covered by the authentication tag. The full computation also includes a few XOR, padding, copying operations, but the total execution time is heavily dependent on the hashing operations. The main processing for one SHA-1 hash consists of four rounds of 20 steps each. These four rounds contain a total of 740 32-bit logical and arithmetic operations (AND, OR, NOT, XOR, modulo addition). In addition to the hash operations, the two 512-bit XOR operations require 32 32-bit logical XOR operations.

However, these two XOR operations can be optimized away. An optimization is possible for small values of M. Each XOR operation in FIG. 2 is followed by a hash operation. The result of the XOR and hash operations can be precomputed and used to replace the original initialization vector (IV) corresponding to that hash operation. These two values only need to be calculated once because the Key and ipad/opad values never change after the initial SRTP exchange of keys. Thus, two hashes can be avoided in the steady state, which reduces the computational overhead to hashing L+1 blocks. For G.711 speech coding at 8000 Hz, each RTP packet payload contains 160 8-bit samples or 160 bytes. The RTP header is 12 bytes long, assuming no CSRC fields. Thus, each RTP packet contains 172 bytes, which means L=ceil(172/64)=3 and N=L+3=6. With the optimization described above, N=L+1=4.

The authentication for each SRTP packet requires 6 SHA1 hash operations, which equates to approximately 740*6=4560 logical operations, which takes 76 ms on a 60 MHz processor, not counting control flow instructions. An attacker can take advantage of this computational overhead by bombarding a victim with forged packets that invoke the authentication process with the sole intent to consume processor cycles.

SUMMARY AND OBJECTS OF THE INVENTION

The present invention was made in order to address the problems of conventional SRTP methods. Described below are three embodiments of the present invention, collectively called SRTP+, that significantly reduce the maximum processor cycles consumed by forged packets. Each embodiment utilizes a message authentication embodiment that does not require authentication of the entire header and payload. This is a departure from SRTP, which performs both message authentication and integrity checking with a single message authentication tag. In contrast, SRTP+ focuses only on authentication, with the intent of identifying forged packets quickly. Thus, in the presence of many forged packets, SRTP+ performs well. However, if all packets are legitimate, a minimal, but constant overhead is imposed. Also described are the expected performances of SRTP+ of the present invention.

A first embodiment of the present invention provides a method for Real-time Transport Protocol (RTP) packet authentication on a packet data network, comprising the steps of: providing a pseudorandom number generator (PRNG) for generating pseudorandom numbers; exchanging a PRNG seed in a secure manner between two end points of the network; assigning one of the pseudorandom numbers to each RTP packet based on an RTP sequence number as an authentication tag on endpoint 1; attaching the assigned pseudorandom number to each of the packets on the endpoint 1, and transmitting the packets to the endpoint 2; generating the pseudorandom number corresponding to the sequence number of the received packet on the endpoint 2; comparing the generated pseudorandom number to the authentication tag included in the arriving RTP packet on the endpoint 2; and authenticating only the RTP packets having the authentication tags which match the generated pseudorandom number; and when a sequence number of an arriving RTP packet is out of order because one or more of the proceeding RTP packets was dropped or delayed, iterating the PRNG multiple times such that the pseudorandom number generated corresponds to the sequence number in the arriving RTP packet, the iterating step starting with the sequence number of the last properly received RTP packet.

A second aspect of the present invention provides a method for Real-time Transport Protocol (RTP) packet authentication on a packet data network, comprising the steps of: selecting a key on endpoint 1 of the network; securely sending the key to endpoint 2 of the network; generating a hash of a sequence number and a timestamp in a packet and sending the hash to the endpoint 2 along with the packet; computing the hash of a sequence number and a timestamp of the received packet using the previously received key on the endpoint 2; comparing the received hash and the computed hash; and if the received hash and the computed hash are equal, accepting the packet.

A third embodiment of the present invention provides a method for Real-time Transport Protocol (RTP) packet authentication on a packet data network, comprising the steps of: generating N ordered, random numbers on Endpoint 1; sending the N random numbers to Endpoint 2 as part of an encrypted payload of a SRTP packet; decrypting and storing the N random numbers on the Endpoint 2; generating one additional random number that is appended to a current sequence of the N random numbers, resulting in N+1 random numbers on the Endpoint 1; sending a first one of the N+1 ordered, random numbers in cleartext form along with remaining ones of the N ordered random numbers in encrypted form in a current packet, from the Endpoint 1 to the Endpoint 2; comparing the random number received in cleartext form on the Endpoint 2 with the N random numbers stored on the Endpoint 2; and if the random number received in cleartext form matches one of the previously stored N random numbers, accepting the packet, which entails decrypting the N random numbers in the packet, and storing the previously stored random numbers as a current set of the N random numbers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
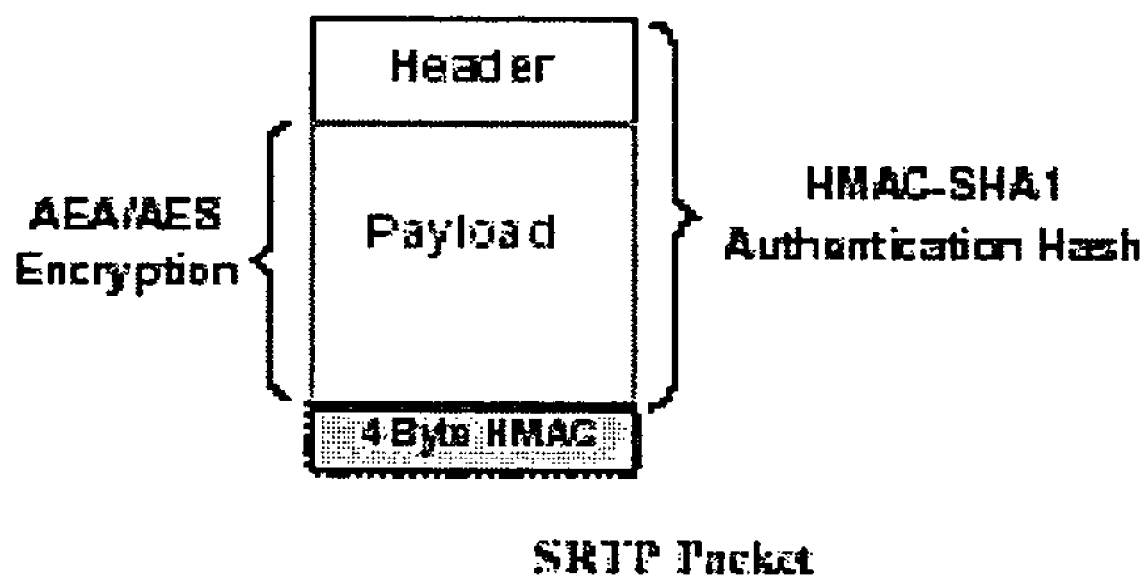
FIG. 1 illustrates a conventional SRTP Packet.
Figure 2:
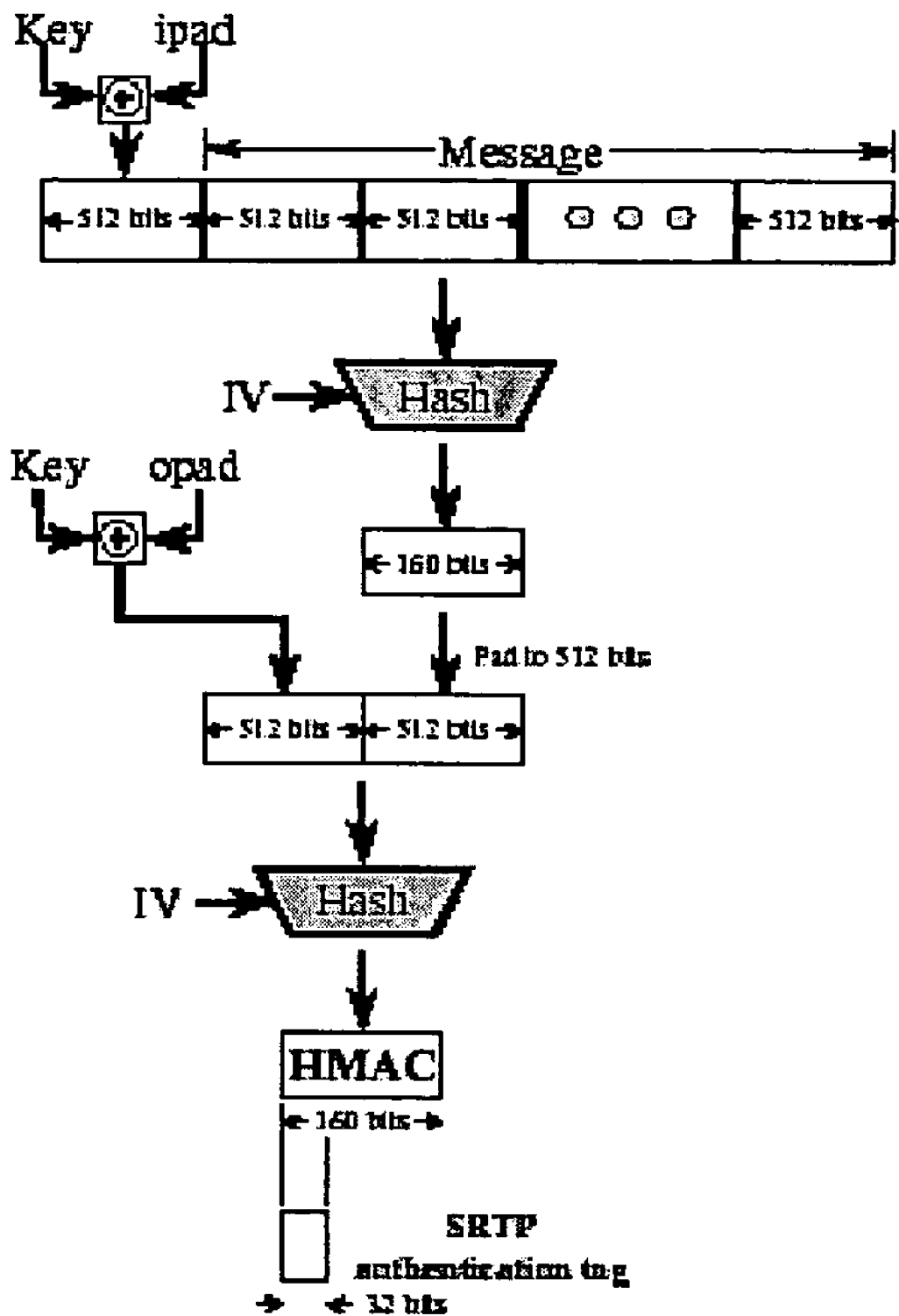
FIG. 2 illustrates an SRTP Authentication Tag Generation using HMAC-SHA1.
Figure 3:
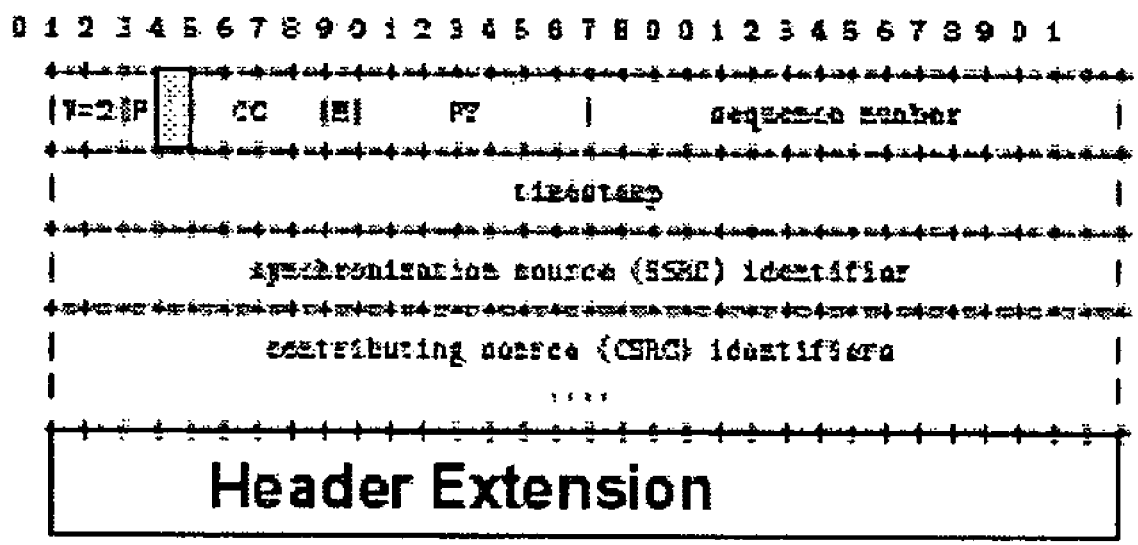
FIG. 3 illustrates the SRTP+ Authentication Tag Location of the present invention.

This section describes the three proposed embodiments for SRTP+. The embodiments differ in the manner in which they generate and verify an authentication tag for each RTP packet. However, all three embodiments append a tag to each packet. FIG. 3 displays the fields of an RTP header. The RTP specification allows header extensions if the Extension (labeled as "X") field is set to 1. The actual header extension is appended to the original header and consists of an extension length as well as the extension data itself. Use of this second location is convenient and simply takes advantage of the existing RTP specification. However, some transport mechanisms might compress the header to minimize bandwidth utilization, in which case header extensions might not be allowed. For that situation, the tag may be attached to the RTP payload immediately after the SRTP HMAC tag, which is shown in FIG. 1.

1. Secret Pseudorandom Number Sequence (Embodiment 1)

Figure 4:
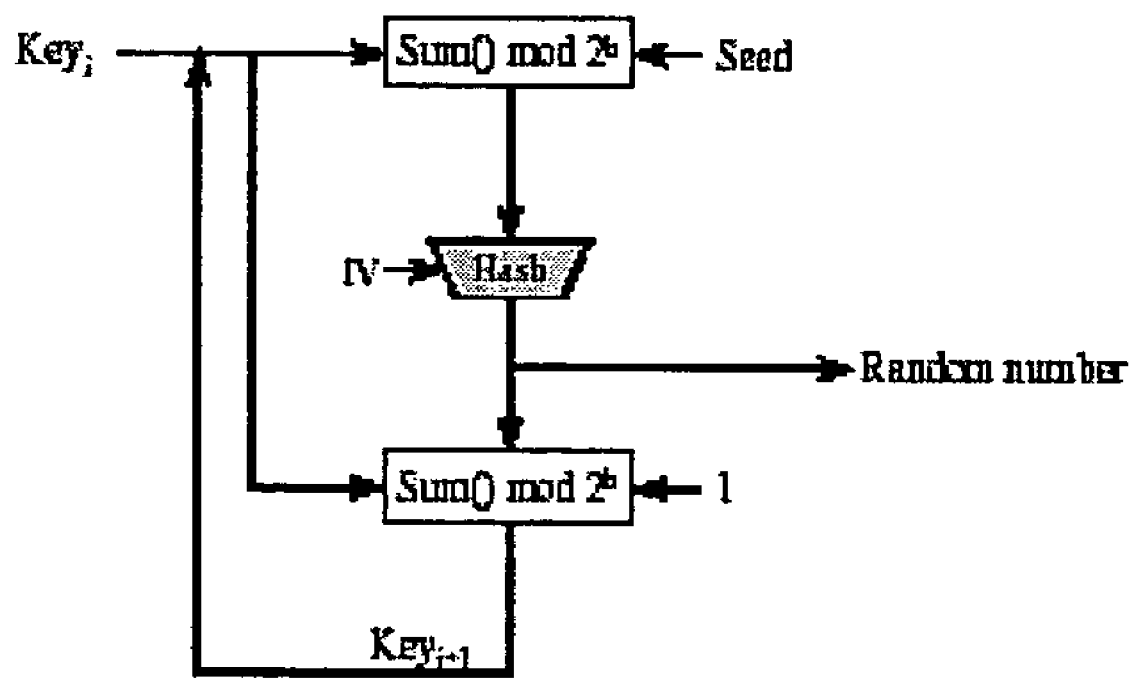
FIG. 4 illustrates the FIPS 140 Approved Cryptographically Secure Pseudo-random Number.

In this embodiment the authentication tag is a number in a cryptographically secure pseudorandom number sequence. Each RTP packet is assigned a pseudorandom number based on its sequence number, as shown in Table 1. Each RTP packet has a sequence number which is included in the packet in a 32 bit field. For use in Avaya products, the pseudorandom number generator (PRNG) must be FIPS-140 approved. There are many PRNGs available including ones which are extremely efficient (because they are extremely simple). Since the PRNG is being used for security, it needs to be "crypto secure" itself. The Federal Information Processing Standard has approved some PRNGs which are "crypto-secure". One such approved PRNG is based on a cryptographic hash, such as SHA1, as shown in FIG. 4.

TABLE 1

Assignment of Pseudorandom Number Based on Sequence Number

| | Sequence # | | | |
|---|---|---|---|---|
| | 1 | 2 | ... 1002 | 1003 |
| Pseudorandom number | R1 | R2 | ... R1002 | R1003 |

Further details regarding pseudorandom number generators (PRNGs) may be found in the following National Institute for Standards and Technology (NIST) documents:

National Institute for Standards and Technology (NIST), "*Security Requirements for Cryptographic Modules*," FIPS Pub 140-2, http://csrc.nist.gov/publications/fips/fips140-2/fips1402.pdf;

National Institute for Standards and Technology (NIST), "*Annex C: Approved Random Number Generators*," FIPS Pub 140-2 Annex C, http://csrc.nist.gov/publications/fips/fips140-2/fips1402annexc.pdf; and National Institute for Standards and Technology (NIST), "*Digital Signature Standard (DSS)*," FIPS Pub 186-2, <http://csrc.nist.gov/publications/fips/fips186-2/fips186-2-change1.pdf>.

Figure 5A:
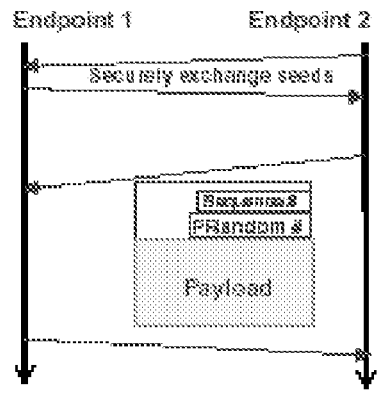
FIG. 5(A) is a schematic diagram of an SRTP+ Communications for Pseudorandom Number Sequence of Embodiment 1 of the present invention.

Both endpoints of the RTP communication must know the pseudorandom number corresponding to each sequence number, both for generating the authentication tag for the outgoing packet and also for verifying the tag of an incoming packet. FIG. 5(A) shows the communications between two endpoints. FIG. 5(A) illustrates a flow chart of this embodiment.

Figure 5B:
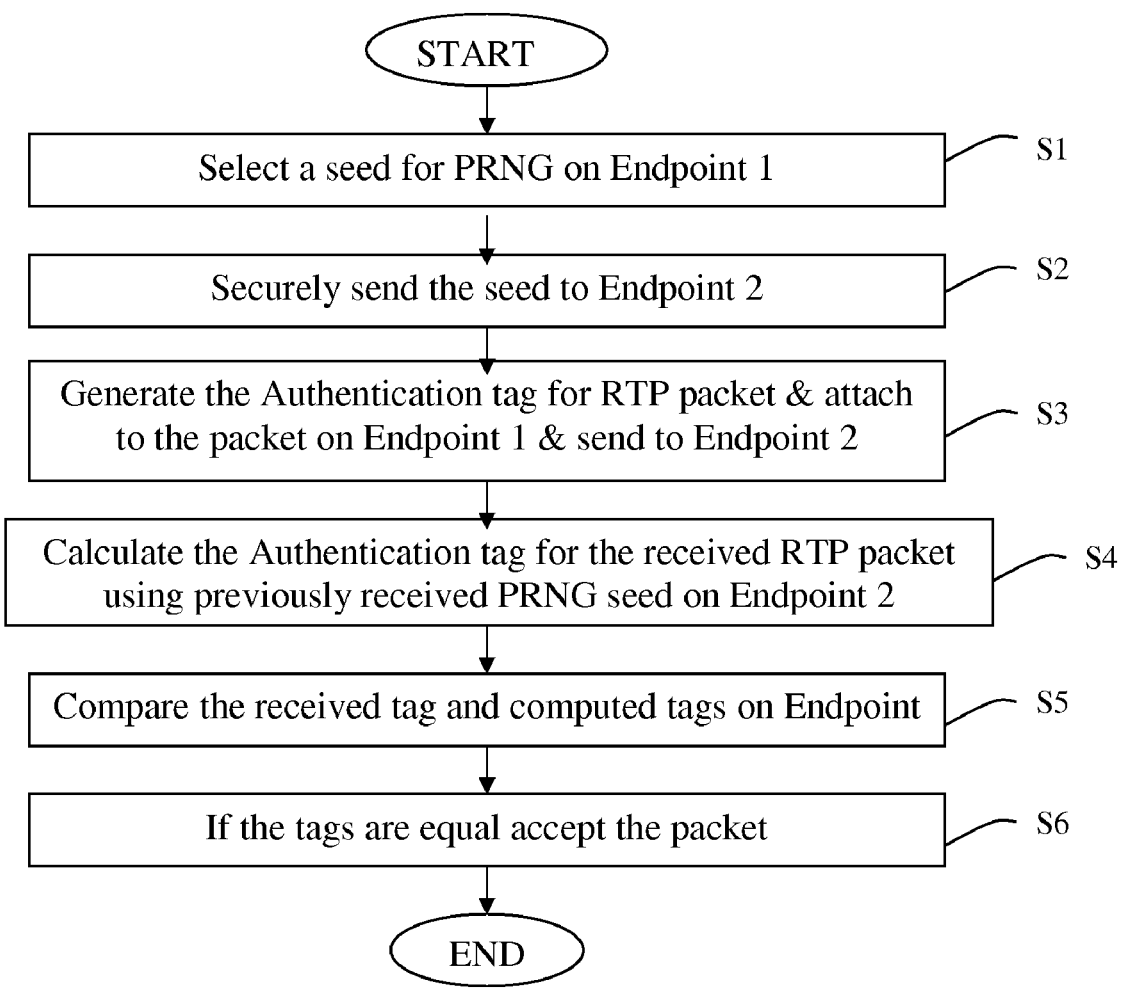
FIG. 5(B) is a flow chart of the steps of the method of Embodiment 1 of the present invention.

As shown in FIG. 5(B), before any RTP packet is sent, the seed for the PRNG is selected (Step S1) and exchanged (Step S2) in a secure manner.

If SRTP is used, then the exchange of SRTP+ PRNG keys can be piggybacked on top of the secure exchange of keys for SRTP. After the keys are exchanged, a 32-bit SRTP+ authentication tag is generated and attached (Step S3) to each RTP packet. This authentication tag can be transmitted in cleartext, since knowledge of the authentication tag for one packet cannot yield the tag for succeeding packets.

For SRTP, a 32-bit rollover counter effectively extends the width of the sequence number to 48 bits. Thus, the sequence numbers in Table 1 can be based on the full 48-bit sequence number. However, in practice no confusion should result even if only the actual 16-bit sequence numbers are considered. For example, if packets are sent at the rate of a packet every 20 ms, then 1310 seconds elapse before the sequence numbers roll over and start to repeat.

If packets arrive out of order or are dropped, the sequence number of the packet will not be the expected number. In that case, the PRNG must iterate multiple times until the pseudorandom number for the correct sequence number is calculated. For example, if the last received sequence number was 1000 and the sequence number of the newly received packet is 1004, then the PRNG must iterate four times to calculate the pseudorandom number corresponding to sequence number 1004. If the packets have indeed arrived out of order, the pseudorandom numbers for the sequence numbers 1001, 1002, and 1003 must be remembered because the PRNG can only calculate numbers going forward from the current number (Step S4). Thus, a sliding window of calculated pseudorandom number must be maintained. In (Step S5) the authentication tag for an incoming packet in compared with the computed tags on Endpoint 2. If the tags are equal (Step S6), the incoming packet is accepted. If the authentication tag for the incoming packet matches the pseudorandom number for the lowest sequence number in the sliding window, then the sliding window can be shifted forward to discard the accepted packet.

The size of the sliding window should be based on the largest forward skip in sequence numbers that can be tolerated by the underlying media codec. One advantage of using a sliding window is that pseudorandom numbers for future packets can be calculated in advance, which allows the computationally intensive portion of the authentication process to be shifted away temporally from the time when a packet arrives.

2. Sequence Number/Timestamp Hash (Embodiment 2)

An alternative to Embodiment 1 avoids the need to maintain a sliding window to remember previously calculated pseudorandom numbers. Instead of using a PRNG, the sequence number and timestamp in the RTP header are hashed using a cryptographically secure hash, such as HMAC-SHA1 to obtain the authentication tag. Thus, each packet is independently verified. Out-of-order and dropped packets do not affect the authentication process.

Figure 6A:
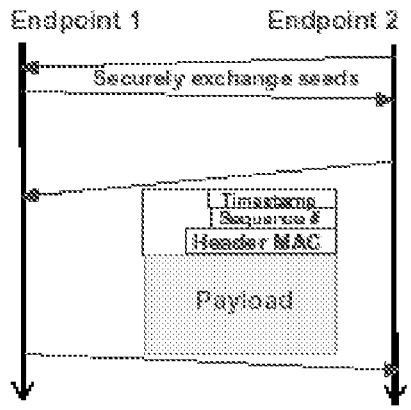
FIG. 6(A) is a schematic diagram of an SRTP+ Communications for Sequence Number/Timestamp Hash of Embodiment 2 of the present invention.
Figure 6B:
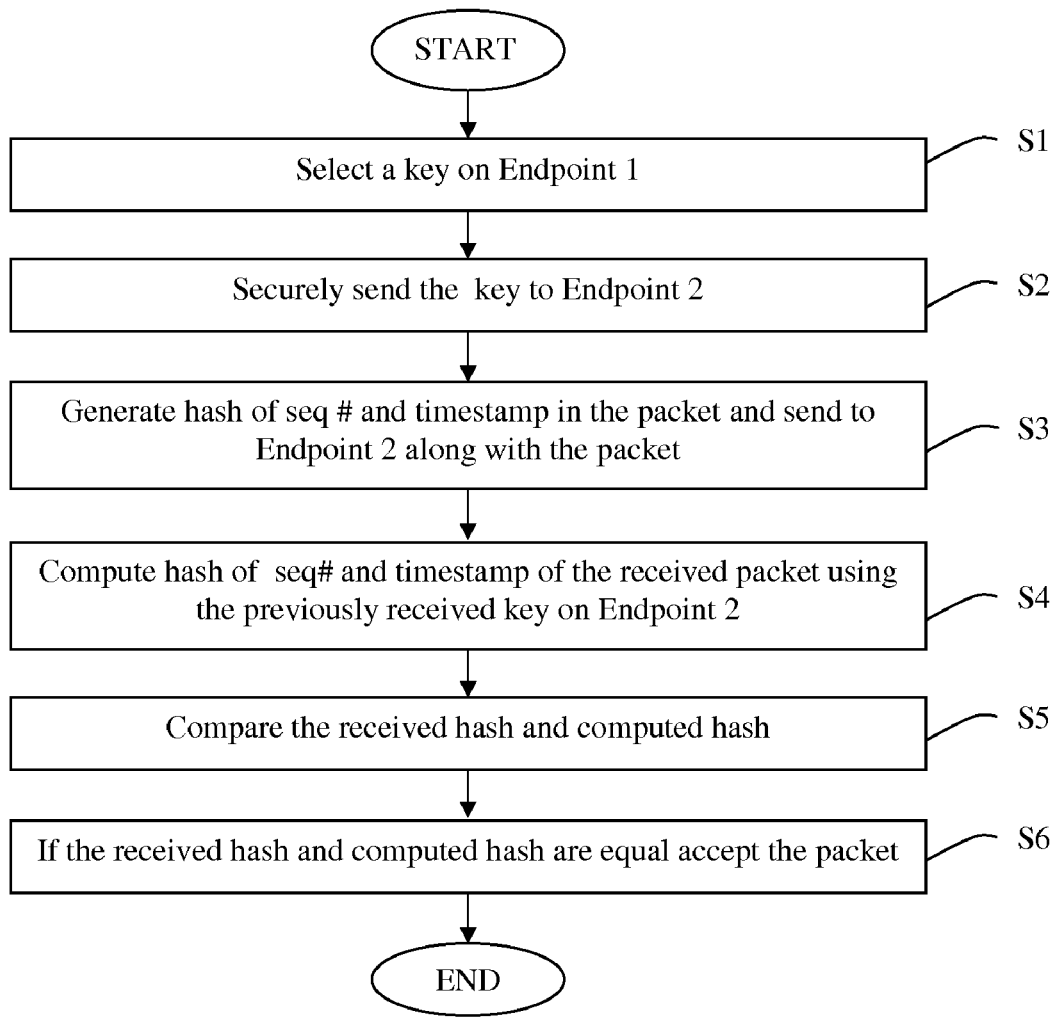
FIG. 6(B) is a flow chart of the steps of the method of Embodiment 2 of the present invention.

FIG. 6(A) shows the communication between the two endpoints. As can be seen in FIG. 6(B), this embodiment is similar to SRTP, except that the message authentication code only authenticates part of the header instead of the entire header and payload. Thus, it should come as no surprise that such a performance savings is realized by applying the same secure hash to a smaller set of bits.

In particular FIG. 6(B) highlights the steps of this embodiment

Selecting a key on Endpoint 1 (Step S1);

Securely sending the key to Endpoint 2 Step S2;

Generating hash of seq # and timestamp in the packet and send to Endpoint 2 along with the packet (Step S3);

Computing hash of seq# and timestamp of the received packet using the previously received key on Endpoint 2 (Step S4);

Comparing the received hash and computed hash (Step S5); and

If the received hash and computed hash are equal, accepting the packet (Step S6).

As with Embodiment 1, the SRTP+ keys can be exchanged along with the SRTP keys. In fact, the same SRTP keys can even be used as the SRTP+keys. The SRTP+ authentication tag can be transmitted in cleartext.

3. Secret Random Number Chaining (Embodiment 3)

Figure 7A:
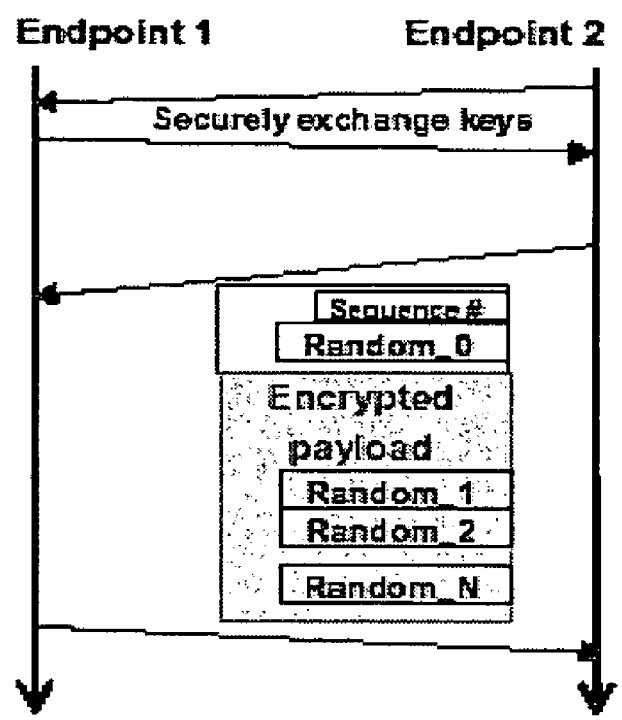
FIG. 7(A) is a schematic diagram of an SRTP+ Communications for Secret Random Number Chaining of Embodiment 3 of the present invention.

Each of Embodiments 1 and 2 depends on SHA1 to either generate a pseudorandom number or to calculate a message digest. Thus, the performance savings realized with either of these two embodiments is limited by the need to perform a SHA1 hash operation on at least one block. A third embodiment avoids the need for SHA1 altogether, but must be used in conjunction with SRTP encryption. In this embodiment the sender calculates in advance a series of random numbers and uses a number as the authentication tag for each packet. The authentication tag is sent in cleartext, but the random numbers for the next N packets are encrypted (e.g., included in the SRTP encrypted payload). The receiver stores the N random numbers after decrypting the payload. These random numbers correspond to the sequence numbers for the next N expected packets and are compared to the authentication tags for succeeding packets for authentication. Before the first packet can be authenticated, the first N random numbers must be sent to the receiver, possibly during the SRTP key exchange. FIG. 7(A) shows the communications between the two endpoints.

Figure 7B:
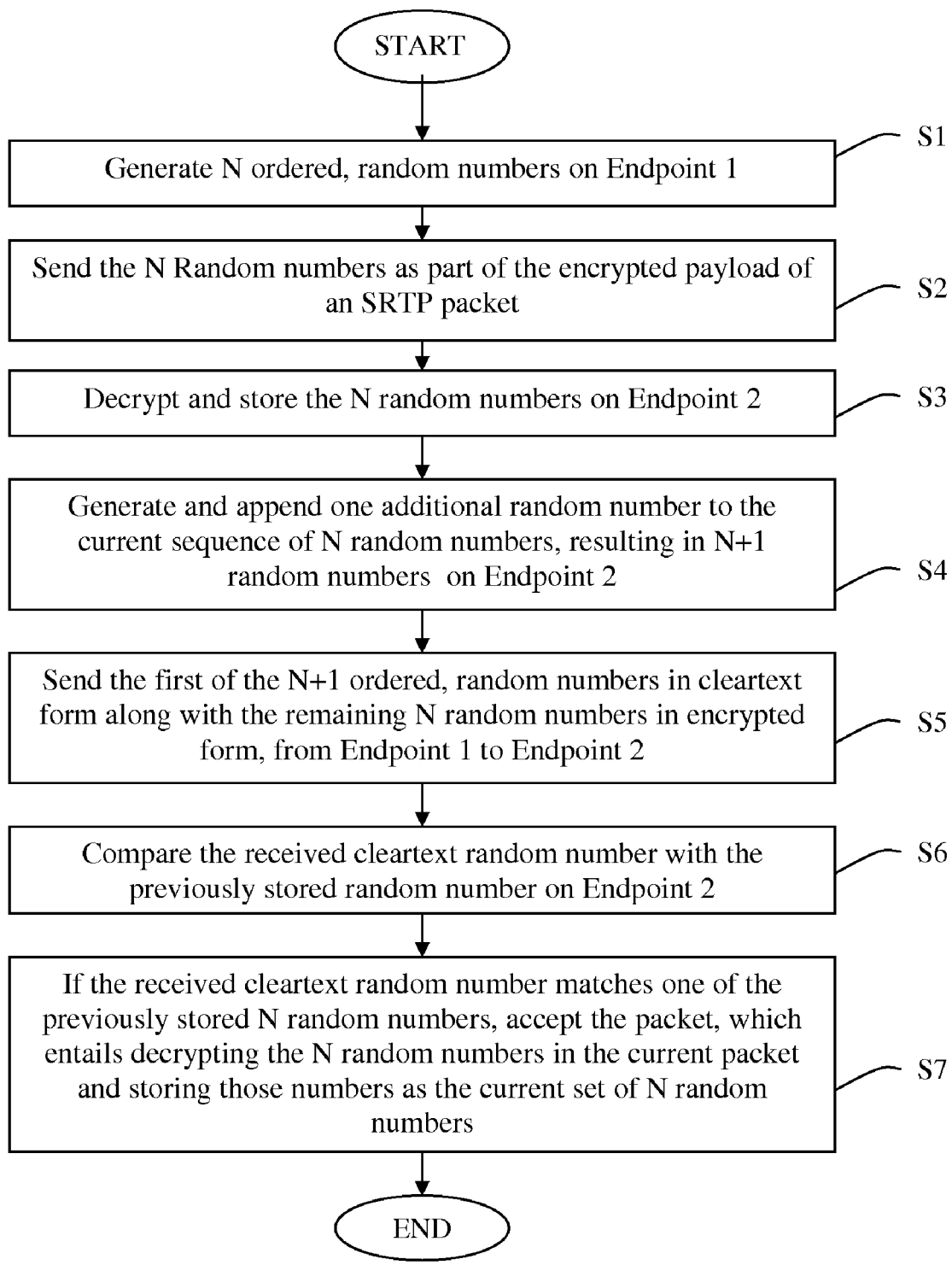
FIG. 7(B) is a flow chart of the steps of the method of Embodiment 3 of the present invention.

FIG. 7(B) highlights the steps of this third embodiment, including:

Generating N ordered, random numbers on Endpoint 1 (Step S1);

Sending the N random numbers to Endpoint 2 as part of the encrypted payload of a SRTP packet (Step S2);

Decrypting and storing the N random numbers on Endpoint 2 (Step S3);

Generating one additional random number that is appended to the current sequence of N random numbers, resulting in N+1 random numbers on Endpoint 1 (Step S4);

Sending the first of the N+1 ordered random numbers in cleartext form along with the remaining N random numbers in encrypted form in a current packet, from Endpoint 1 to Endpoint 2 (Step S5);

Comparing the cleartext random number received on Endpoint 2 with the N random numbers stored on Endpoint 2 (Step S6); and If the cleartext random number received matches one of the previously stored N random numbers, accepting the current packet, which entails decrypting the N random numbers in the current packet, and storing the previously stored random numbers as the current set of N random numbers (Step S7).

Steps 1, 2, and 3 above represent the initial activity done once per session during the session creation, and Steps 4-7 represent the per-packet activity done for each packet.

The main advantage of this embodiment is the extremely low overhead of verifying authentication, which requires a simple arithmetic comparison. However, additional bytes need to be encrypted at the sender and decrypted at the receiver. If the last block of the block cipher encryption involves a number of cleartext bits that is less than the block size, the unused bits can be used to hide the N random numbers. Unfortunately, the default 160-byte payload for G.711 encoding leaves no unused bits when used with 128-bit AES blocks.

Furthermore, these encrypted bytes increase the size of the RTP payload. A further disadvantage is the need to transmit the full set of N random numbers with each packet, which carries a great deal of redundancy. One possible mitigation is to minimize the width of the random numbers. Since the numbers can be truly random, as opposed to pseudorandom, the width of the numbers can be very small, since truly random numbers cannot be predicted based upon knowledge of previous numbers. Perhaps, the width can be as small as 4 bits for each number. Also, the value of N can be limited by the maximum forward skip in sequence numbers allowed by the media codec.

4. Performance Analysis of the Embodiments of the Present Invention

Figure 8:
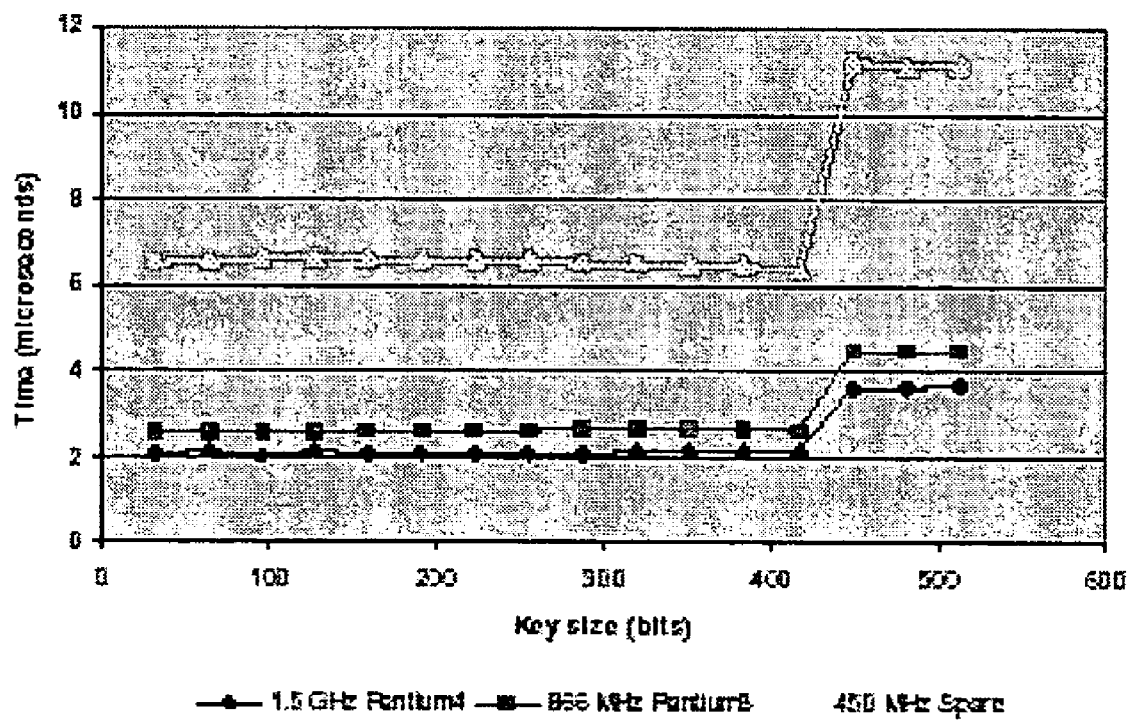
FIG. 8 illustrates the time to generate one pseudorandom number with the method of Embodiment 1 as a function of key size.

To gain an understanding of the anticipated performance improvements from each of the three SRTP+ embodiments, we implemented a version of the embodiments on several systems as shown in FIG. 8.

As can be seen in FIG. 8, the systems were (1) a 1.5 GHz Pentium IV system with 256 MB of RAM running Linux 2.4.7-10, (2) an 866 MHz 2-CPU Pentium III system with 512 MB of RAM running Linux 2.4.20-20.9, and (3) a 450 MHz 4-CPU Sparc system with 4 GB RAM.

All test programs executed on a single CPU, and memory contention was not an issue. The open-source beecrypt-3.1.0 package was used for the SHA1 and HMAC-SHA1 implementations.

Table 2 shows the measured performance for each of the three SRTP+ embodiments as well as the performance for SRTP. These numbers only show the performance for the portion of the run-time overhead imposed by the random number generation for Embodiment 1, the HMAC-SHA1 code generation for Embodiment 2, the AES encryption of one 128-bit block for Embodiment 3, the HMAC-SHA1 code generation for SRTP with a 172-byte RTP packet, which is common for VoIP applications. Although the actual platforms on which real VoIP systems are deployed may differ from these test systems, the relative performance of SRTP+ on most systems should be similar to the results presented in Table 2.

TABLE 2

Measured Performance for SRTP+ Embodiments

| | 1.5 GHz Pentium IV | | | 866 MHz Pentium III | | | 450 MHz Sparc | | |
|---|---|---|---|---|---|---|---|---|---|
| | µs | Steady-state overhead | Attack speedup | µs | Steady-state overhead | Attack speedup | µs | Steady-state overhead | Attack speedup |
| Scheme 1 | 2.04 | 26% | 3.8 | 2.59 | 28% | 3.5 | 5.95 | 26% | 3.8 |
| Scheme 2 | 5.28 | 68% | 1.5 | 6.53 | 71% | 1.4 | 16.31 | 72% | 1.4 |
| Scheme 3 | 0.47[6] | 6% | 16.5 | 0.80[7] | 9% | 11.5 | 2.83[8] | 12% | 8.0 |
| SRTP | 7.75 | | | 9.19 | | | 22.68 | | |

As shown in Table 2, reference numerals 5, 6, 7, and 8, indicate the following for Embodiment (Scheme) 3:

Reference Numeral 5: The number of 128-bit AES blocks depends on the size and number of random numbers needed for Embodiment 3. The assumption for these experiments is that 32 4-bit random numbers are sufficient;

Reference Numeral 6: 0.47 ms is the time for a 128-bit key. For 192-bit and 256-bit keys, the times are 0.56 ms and 0.66 ms on 1.5 GHz Pentium IV;

Reference Numeral 7: 0.80 ms is the time for a 128-bit key. For 192-bit and 256-bit keys, the times are 0.96 ms and 1.10 ms on 866 MHz Pentium III; and Reference Numeral 8: 2.83 ms is the time for a 128-bit key. For 192-bit and 256-bit keys, the times are 3.23 ms and 3.62 ms on 450 MHz Sparc.

Several observations can be made from Table 2. The most significant observation is that all three embodiments offer a performance improvement relative to SRTP. However, the actual speedup is less than an order of magnitude, except for Embodiment 3. The relative numbers are intuitive. Table 3 shows the time on each of our test systems to calculate the SHA1 digest for a 512-bit message block. Looking again at the numbers in Table 2, we see that Embodiment 1 spends most of its time calculating a single SHA1 hash. For Embodiment 2, L=ceil(4/64)=1, and N=L+1=2, which means that Embodiment 2 must calculate the SHA1 digest for two 512-bit blocks and therefore requires a little more than twice the run-time compared to Embodiment 1. For SRTP and a 172-byte RTP packet, L=ceil(172/64)=3, and N=L+1=4.

As expected, the run-times for SRTP are approximately 4 times that for Embodiment 1. Embodiment 3 is much faster than the other embodiments largely because the 128-bit AES block cipher encryption operates on a smaller input block compared to the 512-bit SHA1 hash operation.

In most cases, one of the SRTP+ embodiments will be used along with SRTP. Thus, two types of overheads can be understood from Table 2.

First, the steady-state overhead is incurred when all incoming packets are successfully authenticated. In that case, the total overhead consists of the SRTP overhead in addition to the SRTP+ overhead. For example, on the first experimental system, the steady-state overheads for Embodiments 1, 2, and 3 are 26%, 68%, and 6%, respectively.

The second type of overhead occurs when a faked packet is detected. A denial of service attack might involve a barrage of faked packets. In such a scenarios, the total overhead on the receiver side is just the SRTP+ overhead, since SRTP+ will detect the fake packet and avoid the need to incur the SRTP overhead.

Again, for the first experimental system, the fake packet detection speedups for Embodiments 1, 2, and 3 are 3.8, 1.5, and 16.5 respectively.

TABLE 3

Time to Apply SHA1 to One 512-bit Message Block

| | Time (µs) |
|---|---|
| 1.5 GHz Pentium IV | 1.40 |
| 866 MHz Pentium III | 1.64 |
| 450 MHz Sparc | 3.96 |

It should be noted that the run-times for Embodiment 1 in Table 2 were based on 160-bit keys to generate the random numbers. FIPS 186-2 [8] specifies that the key size must be 160 to 512 bits inclusive. FIG. 8 shows the time required to generate one pseudorandom number for various key sizes. The key size does not affect the time, except at a key size of 448 bits, when the time suddenly doubles. This increase occurs at 448 bits because SHA1 requires a 64-bit message length to be appended to the message. Hence at 448 bits, an extra 512-bit block needs to be processed.

EFFECTS OF THE INVENTION

The three SRTP+ embodiments present techniques for tolerating a denial of service attack based on a barrage of faked RTP packets. Such a barrage of packets might demand sufficient computing resources to prevent the system from delivering the expected service. The SRTP+ embodiments allow quick authentication of packets and thus decrease the potential load on the processor.

In steady-state operation, SRTP+ imposes an additional overhead. Fortunately, such an overhead is less onerous in steady-state operation, i.e., in the absence of a denial of service attack. On the other hand, the reduction of processor load for detecting fake packets is very important in a denial of service situation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for Real-time Transport Protocol (RTP) packet authentication on a packet data network, comprising:
   providing a pseudorandom number generator (PRNG) for generating a plurality of pseudorandom numbers;
   exchanging a PRNG seed between an endpoint 1 and an endpoint 2 of the network;
   assigning one of the pseudorandom numbers to each RTP packet based on an RTP sequence number as an authentication tag on endpoint 1;
   attaching a given assigned pseudorandom number to each of the RTP packets on endpoint 1,
   transmitting the packets to endpoint 2;
   generating, for each packet that is received at endpoint 2, the pseudorandom number corresponding to the sequence number of each received packet;
   comparing, for each packet received at endpoint 2, the generated pseudorandom number to the authentication tag included in the received RTP packet; and
   authenticating only those RTP packets having authentication tags which match the generated pseudorandom number; and
   when a sequence number of an RTP packet received at endpoint 2 is out of order because one or more proceeding RTP packets was dropped or delayed, iterating the PRNG multiple times so that the pseudorandom number generated corresponds to the sequence number in the received out-of-order RTP packet, the iterating function beginning with the sequence number of an RTP packet that was received at endpoint 2 in order, immediately prior to the one or more dropped or delayed RTP packets causing the out of order sequence number of the received RTP packet.

2. The method of claim 1, further comprising storing current sequence numbers for packets received in order.

3. The method of claim 1, wherein iterating further includes calculating pseudorandom numbers corresponding to sequence numbers of RTP packets not yet received.

4. The method of claim 1, wherein the pseudorandom number is an authentication tag assigned to each of the packets.

5. The method of claim 1, wherein the pseudorandom number is based on a cryptographic hash.

6. The method of claim 5, wherein the cryptographic hash is HMAC-SHA1.

7. The method of claim 1, wherein a pseudorandom number attached to an RTP packet is transmitted as clear text and is not required to be encrypted.

8. The method of claim 1, wherein the sequence number has a length of 16 bits.

9. The method of claim 1, wherein the sequence number has a length of 48 bits.

10. A method for Real-time Transport Protocol (RTP) packet authentication on a packet data network, comprising:
- selecting a key on endpoint 1 of the network;
- sending the key to endpoint 2 of the network;
- generating a hash of a sequence number and a timestamp in a packet;
- sending the hash and packet to endpoint 2, the hash being an authentication tag;
- computing the hash of the sequence number and timestamp of the packet that was sent to endpoint 2 using the key received at endpoint 2;
- comparing the hash sent with the packet received at endpoint 2 and the computed hash; and
- if the hash and the computed hash are equal, accepting the packet received at endpoint 2.

11. The method of claim 10, wherein the sequence number and timestamp are hashed using a cryptographically secure hash.

12. The method of claim 10, wherein the cryptographically secure hash is HMAC-SHA1.

13. The method of claim 10, wherein the sequence number has a length of 16 bits.

14. The method of claim 10, wherein the sequence number has a length of 48 bits.

15. A method for Real-time Transport Protocol (RTP) packet authentication on a packet data network, comprising:
- generating N ordered, random numbers on an Endpoint 1 of the network;
- sending the N random numbers to an Endpoint 2 of the network as part of an encrypted payload of a SRTP packet;
- decrypting and storing the N random numbers on the Endpoint 2;
- generating one additional random number that is appended to a current sequence of the N random numbers, resulting in N+1 random numbers on the Endpoint 1;
- sending a first one of the N+1 ordered, random numbers in cleartext form along with remaining ones of the N ordered random numbers in encrypted form in a current packet, from the Endpoint 1 to the Endpoint 2;
- comparing the random number received in cleartext form on the Endpoint 2 with the N random numbers stored on the Endpoint 2; and
- if the random number received in cleartext form matches one of the previously stored N random numbers, accepting the packet, which entails decrypting the N random numbers in the packet, and storing the previously stored random numbers as a current set of the N random numbers.

16. The method of claim 15, wherein the packet is a VoIP packet.

* * * * *